May 28, 1957 MOTOHARU KURATA ET AL 2,793,471
APPARATUS FOR AUTOMATICALLY SCORING AND
CRACKING OF GLASS SHEETS
Filed March 26, 1954 2 Sheets-Sheet 1

INVENTORS.
Motoharu Kurata
Sunao Shibata
BY
ATTORNEYS.

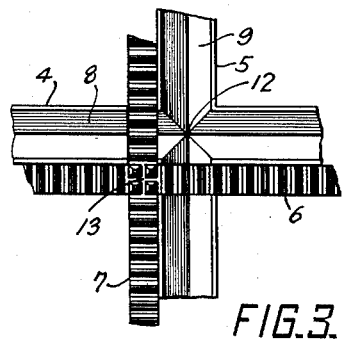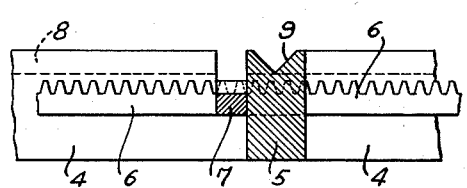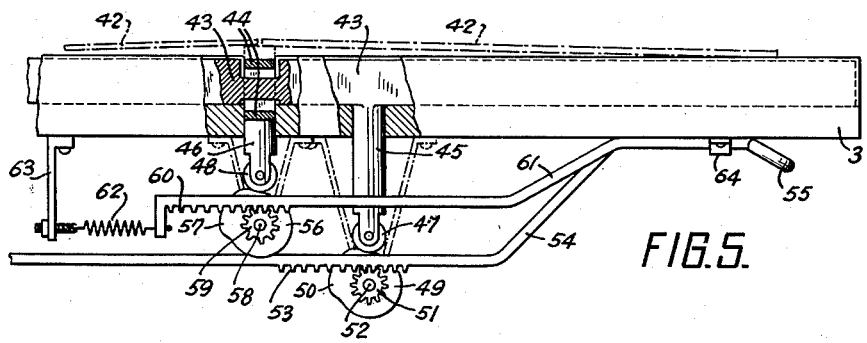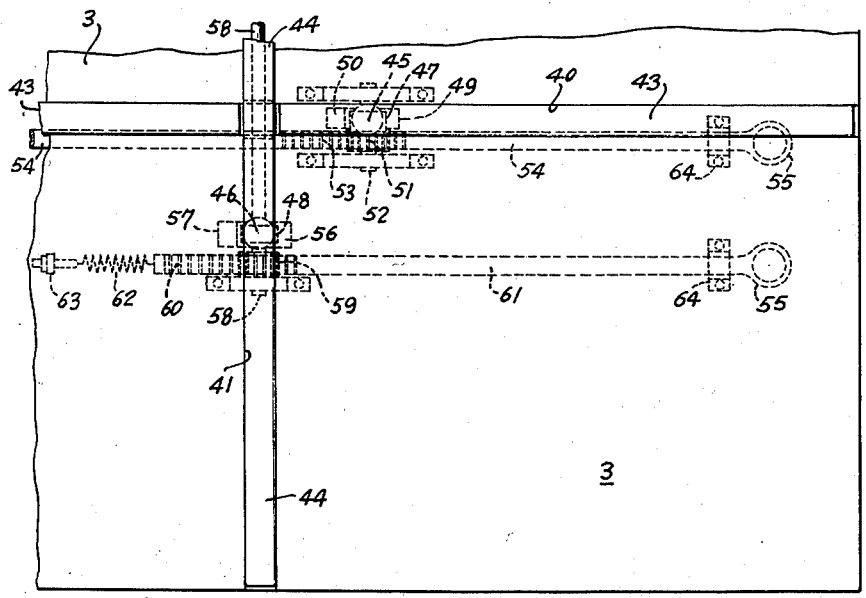

United States Patent Office 2,793,471
Patented May 28, 1957

2,793,471
APPARATUS FOR AUTOMATICALLY SCORING AND CRACKING OF GLASS SHEETS

Motoharu Kurata, Tokyo, and Sunao Shibata, Yokohama City, Japan, assignors to Asahi Kabushiki Kaisha (Asahi Glass Co., Ltd.), Tokyo, Japan, a corporation of Japan Application March 26, 1954, Serial No. 418,973

Claims priority, application Japan March 30, 1953

7 Claims. (Cl. 49—48)

The present invention relates to an apparatus for automatically scoring glass sheet and subsequently cracking off the scored glass sheet, and more particularly an apparatus, in which scoring operation is first effected longitudinally and transversely in predetermined accurate sizes on glass sheet laid on a stationary scoring table and the scored glass sheet is then cracked off or broken into desired glass sheet sections of accurate sizes along the longitudinal and transverse score lines.

An object of this invention is to provide an apparatus by means of which there is obtained simply and at high efficiency, extraordinarily speedily and economically, glass sheet sections of exact size which are of specific sizes, and accordingly not needed in abundance and which have hitherto been cut on a table for cutting glass sheet with hands using rulers.

Another object of this invention is to provide an apparatus, in which glass sheet on a glass sheet scoring table is longitudinally and transversely scored in predetermined size, so that it may be readily cracked off into the desired sections of glass sheet.

A further object of this invention is to provide an apparatus, wherein sections of glass sheet of a predetermined size are obtained by cracking off the glass sheets along the longitudinal and transverse score lines which have been made in predetermined dimensions, by pressing longitudinally and transversely cracking off bars against the scored sheet of glass alternately.

Still other objects, features and advantages of this invention will be apparent from the detailed descriptions as set forth hereinafter.

The present invention lies in an apparatus for automatically scoring glass sheet and then cracking off the scored glass sheet, characterized in that longitudinally and transversely moving beds carrying longitudinally and transversely scoring tools for a glass sheet respectively are arranged adjacent to a stationary scoring table for glass sheets at the longitudinal outside and transverse outside of the said scoring table, and those two beds are made to run alternately on guide rails intersected partly on the same plane outside or underneath the said scoring table on one hand and on rack bars secured respectively to each one side portions of the said guide rails along these guide rails and partly intersected similarly on the other hand, so as to make longitudinal and transverse lines of scoring to the glass sheet to be cracked off on the scoring table by actuating the scoring tools for glass sheets on the said glass sheet, and thereafter the scored glass sheet is broken apart by raising consecutively numerous longitudinal and transverse cracking off bars or members having been housed as movable up and down in several rows of longitudinal and transverse grooves provided in the said scoring table with a predetermined spacing to one another and intersecting partially always on the same plane with the said table, by means of several lifting rods actuating those cracking off members, which bars engage respectively with back surfaces of cracking off bars disposed below the scoring table.

Thus, according to the present invention, sections of glass sheet having exact sizes may be obtained mechanically extremely rapidly, by cracking off the glass sheet having been scored longitudinally and laterally.

In order that the present invention may be more clearly understood, one preferred embodiment thereof will now be described, by way of example, with reference to the accompanying drawings, in which:

Fig. 3 is an enlarged fragmental plan view of the intersecting portions of guide rails and rack bars secured thereto;

Fig. 4 is an elevation thereof;

Fig. 5 is a partial sectional enlarged side view of the apparatus of this invention, with a part thereof being broken away and Fig. 6 is a plan view thereof.

Figure 1:
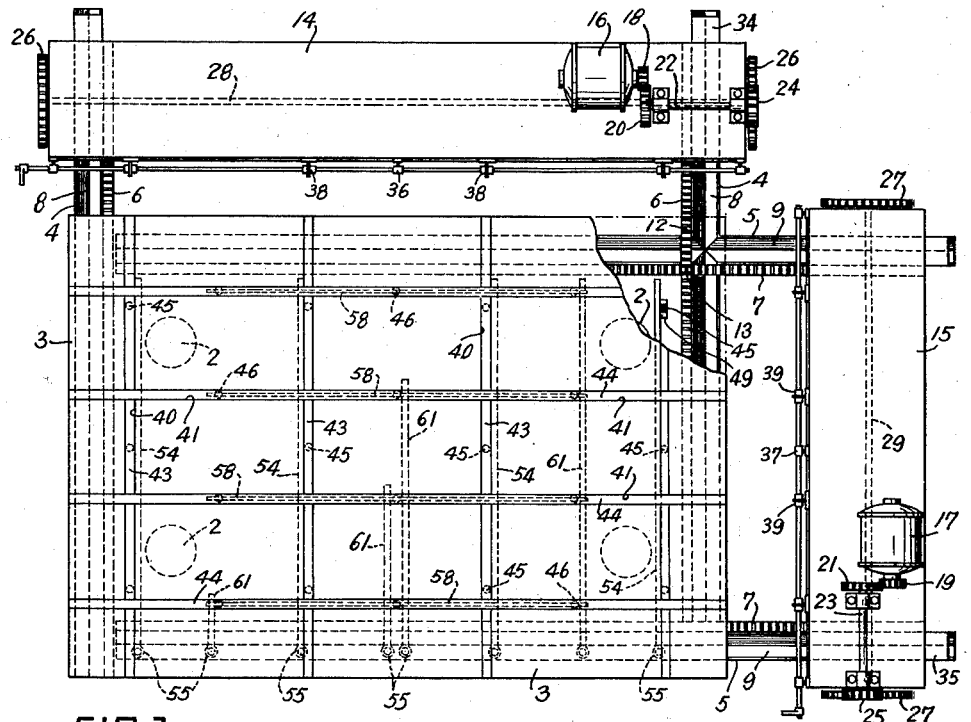
Fig. 1 is a plan view of the scoring apparatus with the glass sheet cutting machine according to the invention, a part of which is broken away to show the intersecting portions.
Figure 2:
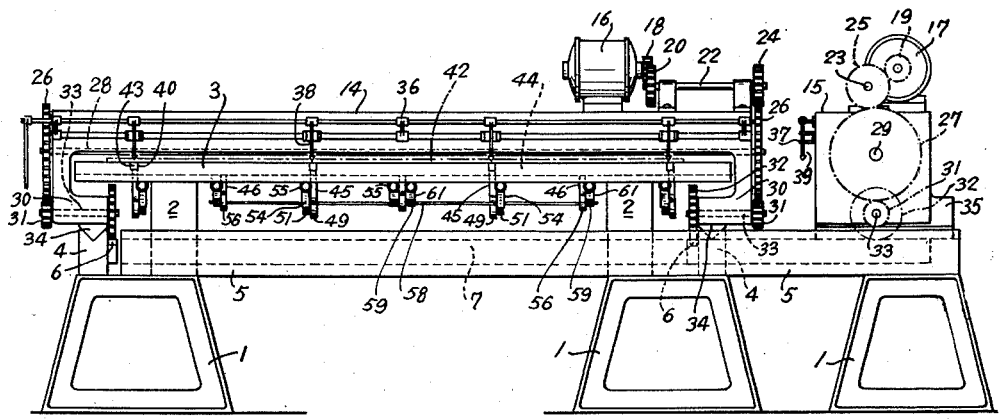
Fig. 2 is an elevation thereof.

In the accompanying drawings, 1 represents a base; a stationary scoring table 3 for laying glass sheets to be cracked off thereon is disposed horizontally on several supporting columns which are provided upright on the base 1; outside or beneath the said scoring table, rack bars 6, 7 are provided respectively along each one side of a pair of spaced longitudinal and transverse guide rails provided with sliding grooves 8 and 9 respectively on their upper surfaces; those guide rails and rack bars are arranged as intersecting each other at right angles so as to be positioned with definite spacing relative to one another, on one plane and in parallel on opposite position; and further each one of those longitudinal and transverse guide rails and rack bars is extended, when either of the longitudinally or transversely moving beds 14 and 15 provided with longitudinal or transverse scoring tools 38 or 39 set in motion, in order to retract one so as not to disturb the movement of the other. The intersecting portions 12 and 13 of the guide rails and rack bars lie in a common plane, thereby enabling the longitudinally moving bed 14 and transversely moving bed 15 to run thereon respectively.

Further, those longitudinally and transversely moving beds 14 and 15 are similarly constructed at their both ends; ends of both sides of the said beds are extended downwards and simultaneously the fore-end portions thereof are bent inwardly and the bent portions thus formed are designated at 30; and a shaft 33 provided respectively on both sides with gear wheels 31 engaging wtih gear wheels 26, 27 as hereafter described as well as gear wheels 32 meshing with said rack bars 6 and 7 is journalled at both ends in said bent portions and simultaneously slidable members 34 are projected from the back surface of the said bent portion and fitted slidably in the said sliding grooves 8, thereby the running of both longitudinally and transversely moving beds 14 and 15 is enabled, and electric motors 16 and 17 are mounted respectively on the upper surfaces of those two beds 14 and 15, the gear wheels 18 and 19 are caused to mesh wtih gear wheels 20 and 21 carried on one end of shafts 22 and 23; gear wheels 24 and 25 of the other end of the said shafts are brought into engagement with one of the gear wheels 26 and 27 carried on both ends of the shafts 28 and 29 extending longitudinally of the beds, and the gear wheels 26, 27 are caused to mesh with gear wheels 31 on one end of the shaft 33 passing through the said bent portions 30 and the gear wheels 32 on the other end thereof mesh with rack bars 6 or 7, and by the revolution of the electric motors the beds are moved fore and backwards exactly.

According to the switch mechanism and connection for the electric motor (not shown in the drawings), for instance, the motor 16 for the longitudinally moving bed 14 is started by closing a switch and rotated clockwise or in the positive direction, which imparts to the said bed 14 a forward travel on the scoring table 3, at the termination of which a limit switch is operated so as to cause the motor to run in the reverse direction so that the said bed is moved back to starting position, where it is stopped; then the transversely moving bed 15 is reciprocated by a similar action of the electric motor 17 for the transversely moving bed 15.

A number of scoring tools 38 and 39 for longitudinal or transverse scorings are carried respectively by holders 36 and 37 for the scoring tools attached at right angle to the guide rails on one side of the longitudinally moving or transversely moving beds 14 and 15 opposite to the scoring table 3, in such a manner that the said tools are capable of changing freely their positions and moving up and down.

In the present invention, for effecting the longitudinal and transverse scorings of the glass sheet on the stationary scoring table, as heretofore explained, the slide beds for longitudinally and transversely cracking-off operation are run alternately, and it is also required that the other slide bed should retract from its passage while the one slide bed is running. The guide rails and rack bars for the slide beds for longitudinally and transversely cracking off have to be intersected. However, if those were intersected simply, the slide beds would not be able to travel, because those slide beds would become obstacles to each other. Therefore, the intersecting portions 12 and 13 for the guide rails 4, 5 and racks 6, 7 are formed with notches as shown in Figs. 3 and 4 in contact with the intersecting portion 12 for guide rails, in which notches rack bars are inserted loosely, while on the other hand the intersecting portion 13 is so constructed that a part of the tooth form is cut off so as to enable the two longitudinally and transversely moving beds to pass through with their gear wheels 32 meshing exactly therewith respectively longitudinally and transversely.

The scoring table for glass sheets 3 is provided with grooves or recesses 40 and 41 longitudinally and transversely in many rows in its surface in parallel and at right angle to each other with predetermined spacings according to the regular sizes of sections of finished glass sheets, in which recesses the cracking-off bars 43 and 44 are housed respectively as intersecting longitudinally and transversely in such a manner that those cracking-off bars may form one plane with the scoring table 3. The longitudinal cracking-off bars 43 are formed thinner in the intersecting portion so as to extend through the transverse cracking-off bars 44 loosely. In addition, the transverse cracking-off bars 44 are enabled to move up and down for any desired distance upward at the intersecting portion independent of the longitudinal cracking-off bars 43. Thus, when the one cracking-off frame is raised, the other cracking-off frame is not allowed to be raised. For each of cracking-off bars 43 and 44, there are respectively provided a suitable number of lifting or pushing-up rods 45 and 46 for cracking off the scored glass sheet in rows of corresponding numbers to those of the cracking-off bars so as to penetrate through lower surface of the scoring table 3 and to engage with the back surface of the cracking-off bars with which rods 45 and 46 the cracking-off bars are caused to be raised or lowered, so that when these cracking off bars are pushed upward, the scored glass sheet may be readily cracked off or broken apart along the lines of scoring.

Thus, such cracking off bars are arranged in appropriate positions on the glass sheet scoring table according to the various predetermined sizes of sections of the glass sheets. By providing a plurality of scoring tables in which the positions of the cracking-off bars differ in the position, glass sheet cutting of all kinds of sizes will be possible.

At the lower ends of the lifting rods 46 raising the transverse cracking-off bars 44, rollers 48 are provided respectively. In order to bring the said rollers in contact with rollers 56 having cams 57 projected therefrom, rollers 56 are mounted respectively on a small shaft 58 horizontally disposed beneath the transversely extending cracking-off bars 44 as shown in Fig. 5. Opposite to the pushing-up rods 46 of each of the transversely extending cracking-off bars, and to either one of the rollers 56 a pinion 59 is attached. The handle bars 61 having respective rack 60 meshing with the said pinion 59 run through the guide 64 secured to the back surface of the scoring table 3 in the front portion thereof, and a grip 55 is provided on the fore-end of the handle bar. A spring 62 is interposed between the end portion of this handle bar 61 and a support member 63 secured to the lower surface of the scoring table 3, and thus when the grip 55 is pulled forward, several pushing-up bars 46 in the same row will be actuated all at the same time by the respective cam 57 through the said rack-pinion gearing and the cam-roller transmission, which will raise the corresponding transverse cracking-off bar 44 respectively.

Each of the lifting rods 45 of the longitudinally extending cracking-off bar 43 carries respectively a roller 47 at the lower end similarly as before; the said roller 47 is provided with a small shaft 52 horizontally in order to come in contact with the roller 49 having a cam 50 projecting therefrom; several pinions 51 are secured respectively to the said shaft; and the handle bar 54 having respective racks 53 meshing with each of those pinions is provided slidably on the lower surface of the scoring table in the front portion; like the handle bar 61 of the longitudinally cracking off bar, a spring is mounted on one end thereof and a grip 55 is attached to the other end thereof; then when the grip is pulled, a number of lifting rods on the same row will be raised all at once, thereby the longitudinally cracking off bars are respectively moved up and down. Thus, the scored glass sheet 42 is broken apart by the lifting action of the lifting rods as shown in Fig. 5.

Further, it is convenient for the operation that aforementioned mechanism is secured on the scoring table at such a position as not to disturb the travel of the longitudinally and transversely moving beds and all the grips are so fixed in one row on the back surface of the scoring table that they may be manipulated easily in front thereof.

The operation of the present invention will be described as follows:

First, the scoring tools are carried on the predetermined positions and with definite spacings; the glass sheet 42 to be scored is placed on the scoring table 3; then the electric motor 16 is started by closing the switch for the longitudinally moving bed 14, thereby the gear wheel 32 meshing with the rack bar 6 is driven through gear transmission, which causes the longitudinally moving bed to make the forward movement, during which each of the scoring tools 38 descends from the desired position by means of a crank arm and effects the longitudinal scoring operation on the glass sheet to be scored to make longitudinal scores, and after this operation is completed the circuit of the motor is changed over by the limit switch to start the reverse revolution. In this reverse revolution, the scoring tools are raised upward by means of a crank arm, in which condition the bed commences its return movement and returns to original position, and the other limit switch operates to stop the electric motor. Then the switch for the electric motor for the transversely moving bed 15 is closed automatically or manually, thereby the transverse scoring operation is carried out by repeating similar operations as described above. Thus longitudinal and transverse scores of predetermined sizes are made, and then the cracking off is carried out first longitudinally or transversely, in any order. For instance, in the longitudinal cracking off, when the grip 55 of the handle bar 54 is pulled forwards from left to right or from right to left consecutively, the lifting bars 45 are actuated by the cams 50 of the rollers 49 on the same row, and the longitudinally cracking off frame 43 is projected above the upper surface of the scoring table 3, thereby the scored glass sheet is pushed upward and cracked off or broken apart along the scored line of the said portion. As soon as the pull is released, the handle bar returns to original position by the action of the spring mounted on the extreme portion thereof, the cam 50 is disengaged from contact with the roller 47 and the lifting rods 45 descends, and simultaneously the longitudinally cracking off bar 43 also descends. Then in a similar operation, the transversely extending cracking off bars are all raised and lowered, and when the grips 55 of the handle bars 61 are pulled forwards, as heretofore described, consecutively, the pinions 59 carried on the small shaft 58 are turned by the racks 60 of the said handle bars, and thereby the said small shaft 58 is rotated and cams 57 of each of the rollers 48 of the lifting bars 46 which raise the transversely extending cracking off bars 44 horizontally to effect the transverse cracking off, thus the scored glass sheet being readily broken apart tranversely. Similarly the transverse cracking off is carried out consecutively and the finished glass sheets of regular dimensions are obtained. Further, as for the descent and ascent of the glass sheet scoring tools 38 and 39, the ascending is also carried out during the backward movement of the longitudinally and transversely moving beds, while the descending is carried out during their forward movement to make the desired scorings.

In the aforementioned embodiment of this invention, one side of the guide rails 5 for the transversely moving beds 15 is elongated, but if desired, both sides of them may be extended and retracting places may be formed for the beds 15 on both sides of the scoring table 3 at the two, front and rear, intersecting places with the guide rails 4 of the longitudinally moving beds, and when the glass sheet scoring tools are provided on both sides of the beds, the time for transverse scoring operation may be reduced further, because the transversely moving beds are adapted to operate the scoring tools in their forward and backward movements alternately.

Further, in this embodiment, four each of longitudinally and transversely cracking off bars are illustrated in the drawings. However, when many suitably spaced longitudinal and transversely cracking off bars are provided, among which any desired ones are only operated, cracking off operations of various sizes can be carried out with a single scoring table.

Furthermore, a method for cracking off glass sheet, in which cracking off is carried out on a single sheet of glass immediately after it has been scored, is referred to in the foregoing descriptions. However, it is also possible to cracking-off glass sheets of more than one in such a way that first the glass sheet laid on the glass sheet scoring table are made longitudinal and transverse scorings and then further another glass sheet is laid thereon and subsequently scored longitudinally and transversely and cracking off is effected by raising the cracking off bars. In this case, most satisfactory results may be obtained by lowering the scoring machine by so many depth corresponding to the thickness of the sheet glass as supplied each time.

Hitherto, the glass sheet cutting of such a type has been customarily hand operated using rulers. Consequently, the sizes of the finished glass sheets as thus obtained are not only irregular, but also the cost is high and the working efficiency is exceedingly low. On the contrary, according to the present invention sections of glass sheet of exact sizes are not only obtainable but also the cutting efficiency is increased considerably and the cost of the operation can be economized extremely, because the glass sheet to be cracked off having mechanically been provided with longitudinal and transverse scorings of accurate definite sizes can be cracked off or broken apart along the score lines on the scoring table by merely pulling the grips forward consecutively and by raising the two, longitudinal and transverse, cracking off bars parallel to each score line.

What we claim is:

1. An apparatus for scoring a sheet of glass along intersecting longitudinal and transverse lines, comprising a scoring table having a planar upper surface for supporting a sheet of glass thereon, a first bed extending transversely of said table and carrying first cutter means for producing longitudinal score lines on said sheet, a second bed extending longitudinally of said table and carrying second cutter means for producing transverse score lines on said sheet, motor means for moving said first and said second beds alternately relative to said table in longitudinal and transverse directions, respectively, and guide means for directing movement of said first and second beds, said guide means including intersecting first and second rack means extending respectively in longitudinal and transverse directions and cooperating respectively with said first and second beds, said first and second rack means lying in and intersecting each other in a common plane parallel to that of said upper surface of said table, whereby each of said beds is capable of moving over said sheet while guided by its respective rack means without interference by the other of said rack means, both of said cutter means effecting scoring of said sheet during movement of their respective beds relative to said table.

2. In an apparatus as defined in claim 1, said guide means being disposed adjacent and below said upper surface of said table, said guide means further including first and second rail means extending parallel to said first and second rack means, respectively, said first and second rail means lying in and intersecting each other in a further common plane extending parallel to the plane of said upper surface of said table, each of said beds being provided with a member riding along a respective one of said rails for being further guided thereby.

3. In an apparatus as defined in claim 1, each of said first and second beds being provided with gear means driven by said motor means, said gear means cooperating with a respective one of said rack means for controlling movement of said beds in predetermined direction relative to said table.

4. In an apparatus as defined in claim 1, each of said beds being provided with means for displacing its respective cutter means from a first position wherein said cutter means will operate upon said glass sheet to a second position wherein said cutter means will not operate upon said sheet, whereby upon movement of each of said beds in one direction relative to said table, said cutter means will effect scoring of said glass whereas in return movement of said beds said cutter means may be maintained out of contact with said sheet.

5. An apparatus for scoring a sheet of glass along intersecting longitudinal and transverse lines and subsequently subdividing said sheet along said score lines, comprising a scoring table having a planar upper surface for supporting a sheet of glass thereon, said upper surface of said table being provided with a plurality of intersecting longitudinally and transversely extending recesses, a first bed extending transversely of said table and carrying first cutter means for producing longitudinal score lines on said sheet, a second bed extending longitudinally of said table and carrying second cutter means for producing transverse score lines on said sheet, motor means for moving said first and said second beds alternately relative to said table in longitudinal and transverse directions, respectively, intersecting first and second rack means extending respectively in longitudinal and transverse directions and cooperating respectively with said first and second beds for guiding the latter during movement, said first and second rack means lying in and intersecting each other in a common plane parallel to that of said upper surface of said table, a plurality of longitudinally extending cracking-off bars disposed respectively in said longitudinally extending recesses of said upper surface of said table, a plurality of transversely extending cracking-off bars disposed respectively in said transversely extending recesses of said upper surface, the overlapping portions of said longitudinally and transversely extending cracking-off bars being formed so that each bar is capable of upward movement independently of the overlapping bars, a plurality of lifting rod means operatively connected with said cracking-off bars, respectively, at a location remote from said upper surface of said table, and means for selectively actuating said lifting rod means, whereby following scoring of said glass sheet the latter may be subdivided along said score lines upon actuation of said cracking-off bars through the intermediary of said actuating means and said lifting rod means.

6. In an apparatus as defined in claim 5, said actuating means including a plurality of roller means operatively connected with said lifting rod means, respectively, a plurality of rotatable cam means operatively connected with said roller means, respectively, for raising and lowering the latter in accordance with the cam profile of said cam means, a plurality of pinion means operatively and rotatably connected with said cam means, respectively, and a plurality of displaceable racks operatively connected with said pinion means, respectively, whereby upon displacing said racks said pinion means are rotated to thereby rotate said cam means for raising of said lifting rod means.

7. In an apparatus as defined in claim 6, including a plurality of spring means operatively connected with said racks, respectively, said spring means urging said racks into a position corresponding to the lowered position of said cracking-off bars, whereby following a cracking-off operation said cracking-off bars are automatically returned to their lowered positions.

References Cited in the file of this patent

UNITED STATES PATENTS

| | | |
|---|---|---|
| 1,140,143 | Falvey | May 18, 1915 |
| 1,167,254 | Benson | Jan. 4, 1916 |
| 1,972,210 | Walron | Sept. 4, 1934 |

FOREIGN PATENTS

| | | |
|---|---|---|
| 290,241 | Great Britain | Dec. 6, 1928 |